US009128271B2

(12) United States Patent
Shimada et al.

(10) Patent No.: US 9,128,271 B2
(45) Date of Patent: Sep. 8, 2015

(54) SUPER WIDE ANGLE LENS AND IMAGING APPARATUS USING IT

(71) Applicant: FUJIFILM Corporation, Tokyo (JP)

(72) Inventors: Yasutaka Shimada, Saitama-ken (JP); Michio Cho, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/452,745

(22) Filed: Aug. 6, 2014

(65) Prior Publication Data

US 2014/0340769 A1    Nov. 20, 2014

Related U.S. Application Data

(63) Continuation of application No. PCT/JP2013/000518, filed on Jan. 31, 2013.

(30) Foreign Application Priority Data

Feb. 6, 2012    (JP) .................... 2012-023015

(51) Int. Cl.
*G02B 9/64* (2006.01)
*G02B 3/00* (2006.01)
*G02B 9/00* (2006.01)
*G02B 13/06* (2006.01)
*G02B 13/00* (2006.01)

(52) U.S. Cl.
CPC    *G02B 13/06* (2013.01); *G02B 9/64* (2013.01); *G02B 13/006* (2013.01)

(58) Field of Classification Search
CPC .... G02B 13/006; G02B 13/009; G02B 13/04; G02B 9/12; G02B 9/64
USPC .................. 359/649, 754, 755, 680, 681, 740
See application file for complete search history.

(56) References Cited

U.S. PATENT DOCUMENTS

| | | | |
|---|---|---|---|
| 4,690,517 | A | 9/1987 | Fujie |
| 5,742,439 | A | 4/1998 | Schuster |
| 6,075,657 | A | 6/2000 | Takada et al. |
| 6,894,847 | B2 | 5/2005 | Suzuki |
| 7,173,766 | B2 | 2/2007 | Kimura et al. |
| 7,880,973 | B2 | 2/2011 | Amano |

(Continued)

FOREIGN PATENT DOCUMENTS

| | | |
|---|---|---|
| JP | 05-74806 | 10/1993 |
| JP | 08-94926 | 4/1996 |

(Continued)

OTHER PUBLICATIONS

International Search Report PCT/JP2013/000518 dated Jun. 18, 2013.

*Primary Examiner* — Alicia M Harrington
(74) *Attorney, Agent, or Firm* — Young & Thompson

(57) ABSTRACT

A super wide angle lens substantially consists of a positive first lens group in which a positive first lens, a negative second lens, a negative third lens, a negative fourth lens, a positive fifth lens, a sixth lens unit that is a cemented lens, a seventh lens, an aperture stop, and an eighth lens unit that is a cemented lens are arranged in this order from an object side, a second lens group in which a first lens unit that is a positive single lens or a cemented lens and a second lens unit that is a cemented lens are arranged in this order from the object side, and a third lens group including a positive lens. The super wide angle lens is structured in such a manner to satisfy conditional formula (1): $0.8<(T16+T17)/f<2.5$.

20 Claims, 10 Drawing Sheets

(56) References Cited

U.S. PATENT DOCUMENTS

2006/0119955 A1 6/2006 Kimura et al.
2010/0053764 A1 3/2010 Amano

FOREIGN PATENT DOCUMENTS

| JP | 11-84232 | 3/1999 |
| JP | 2004-219610 | 8/2004 |
| JP | 2005-010668 | 1/2005 |
| JP | 2010-054693 | 3/2010 |

SUPER WIDE ANGLE LENS AND IMAGING APPARATUS USING IT

CROSS-REFERENCE TO RELATED APPLICATIONS

This application is a Continuation of PCT International Application No. PCT/JP2013/000518 filed on Jan. 31, 2013, which claims priority under 35 U.S.C. §119(a) to Japanese Patent Application No. 2012-023015 filed on Feb. 6, 2012. Each of the above applications hereby expressly incorporated by reference, in its entirety, into the present application.

BACKGROUND OF THE INVENTION

1. Field of the Invention

The present invention relates to a small-size super wide angle lens with high performance usable in a digital camera, a camera for broadcasting and a camera for shooting a movie.

2. Description of the Related Art

Conventionally, imaging lenses with full angles of view: 2ω exceeding 80 degrees were proposed.

For example, Japanese Patent Publication No. 5(1993)-074806 (Patent Document 1) discloses a super wide angle lens with an angle of view exceeding 94 degrees. Further, Japanese Unexamined Patent Publication No. 8(1996)-094926 (Patent Document 2) discloses a super wide angle lens with an angle of view of 102.2 degrees in which chromatic aberrations are excellently corrected. Further, Japanese Unexamined Patent Publication No. 2004-219610 (Patent Document 3) proposes a rear-focus-type super wide angle lens with an angle of view of 88.7 degrees.

SUMMARY OF THE INVENTION

However, the imaging lenses disclosed in Patent Document 1 (Japanese Patent Publication No. 5 (1993)-074806) and Patent Document 2 (Japanese Unexamined Patent Publication No. 8(1996)-094926) are imaging lenses for cameras for silver halide films, and the angle of incidence of an outermost chief ray to an image plane is large. Therefore, they are not appropriate for a camera for broadcasting, a camera for shooting a movie, a digital camera and the like, which obtain an image by using an imaging device, such as a CCD or CMOS sensor.

Further, the imaging lenses disclosed in Patent Documents 1 and 2 are silent about a case of performing focusing, and it is conceivable that focusing is performed by moving all lens groups. However, in recent years, focusing by moving only a part of lens groups that has light weight is requested to increase the speed of focusing.

Further, Patent Document 3 (Japanese Unexamined Patent Publication No. 2004-219610) discloses a rear-focus-type wide angle lens. However, FNo. is 3.6, which means a slow lens. Further, a thick heavy lens is moved when focusing is performed. Therefore, the imaging lens disclosed in Patent Document 3 is not able to sufficiently increase the speed of focusing.

In view of the aforementioned circumstances, it is an object of the present invention to provide a small-size super wide angle lens with a small F-number and high performance, in which the angle of incidence to an image plane is sufficiently small even at an outermost angle and the weight of a focusing group is light, and an imaging apparatus using the super wide angle lens.

A super wide angle lens of the present invention substantially consists of three groups of a first lens group having positive refractive power, a second lens group having positive refractive power and a third lens group in this order from an object side. The first lens group consists of a first-group first lens having a meniscus shape with its convex surface facing the object side and positive refractive power, a first-group second lens having a meniscus shape with its convex surface facing the object side and negative refractive power, a first-group third lens having a meniscus shape with its convex surface facing the object side and negative refractive power, a first-group fourth lens having negative refractive power, and a lens surface of which with a smaller absolute value of a curvature radius faces an image side, a first-group fifth lens having positive refractive power, and a lens surface of which with a smaller absolute value of a curvature radius faces the image side, a first-group sixth lens unit that is a cemented lens composed of a lens having positive refractive power and a lens having negative refractive power cemented together, a first-group seventh lens having a meniscus shape with its concave surface facing the object side, a stop and a first-group eighth lens unit that is a cemented lens composed of a lens having negative refractive power and a lens having positive refractive power cemented together, in this order from the object side. The second lens group consists of a second-group first lens unit that is a single lens having positive refractive power or a cemented lens composed of a lens having positive refractive power and a lens having negative refractive power cemented together and a second-group second lens unit that is a cemented lens composed of a lens having positive refractive power and a lens having negative refractive power cemented together, in this order from the object side. The third lens group includes at least one lens having positive refractive power. Further, conditional formula (1): $0.8<(T16+T17)/f<2.5$ is satisfied. Here, T16 is a thickness of the first-group sixth lens unit that is a cemented lens, and T17 is a thickness of the first-group seventh lens, and f is a focal length of an entire lens system when the system is focused on an object point at infinity.

It is desirable that the super wide angle lens satisfies conditional formula (1'): $1.0<(T16+T17)/f<2.0$. It is more desirable that conditional formula (1"): $1.1<(T16+T17)/f<1.9$ is satisfied.

It is more desirable that the super wide angle lens satisfies conditional formula (2): $0.20<f/f16<0.60$. It is even more desirable that conditional formula (2'): $0.30<f/f16<0.50$ is satisfied. Here, f16 is a focal length of the first-group sixth lens unit that is a cemented lens.

It is more desirable that the super wide angle lens satisfies conditional formula (3): $0.1<f/f2<0.4$. It is even more desirable that conditional formula (3'): $0.15<f/f2<0.3$ is satisfied. Here, f2 is a focal length of the second lens group.

It is more desirable that the super wide angle lens satisfies conditional formula (4): $0.4<Tsum2/f<0.9$. It is even more desirable that conditional formula (4'): $0.5<Tsum2/f<0.8$ is satisfied. Here, Tsum2 is a total thickness of lenses constituting the second lens group.

The third lens group may consist of a third-group first lens having a meniscus shape with its concave surface facing the image side and negative refractive power and a third-group second lens unit that is a cemented lens composed of a lens having positive refractive power and a lens having negative refractive power cemented together, in this order from the object side.

An imaging apparatus of the present invention includes the super wide angle lens as described above.

The expression "a super wide angle lens substantially consisting of three groups" means that a lens substantially without refractive power, an optical element, such as a stop and a cover glass, other than lenses and a mechanism part, such as a lens flange, a lens barrel, an imaging device and a hand shake blur correction mechanism, may be included in addition to the three groups. As described above, the super wide angle lens consisting of three groups may consist of only the three groups. Alternatively, the super wide angle lens consisting of three groups may include a lens without refractive power and an optical element and the like other than lenses, besides the three groups.

The sign of a curvature radius of a lens surface is positive when a surface is convex toward the object side, and negative when a surface is convex toward the image side.

A focal length of each lens, a focal length of plural lenses in combination (combined focal length) and a focal length of a lens group are represented in such a manner that a positive focal length and a negative focal length are distinguished from each other.

In the super wide angle lens of the present invention and the imaging apparatus using the super wide angle lens, three groups of a first lens group having positive refractive power, a second lens group having positive refractive power and a third lens group are arranged in this order from an object side. The first lens group consists of a first-group first lens having a meniscus shape with its convex surface facing the object side and positive refractive power, a first-group second lens having a meniscus shape with its convex surface facing the object side and negative refractive power, a first-group third lens having a meniscus shape with its convex surface facing the object side and negative refractive power, a first-group fourth lens having negative refractive power, and a lens surface of which with a smaller absolute value of a curvature radius faces an image side, a first-group fifth lens having positive refractive power, and a lens surface of which with a smaller absolute value of a curvature radius faces the image side, a first-group sixth lens unit composed of a lens having positive refractive power and a lens having negative refractive power cemented together, a first-group seventh lens having a meniscus shape with its concave surface facing the object side, a stop and a first-group eighth lens unit composed of a lens having negative refractive power and a lens having positive refractive power cemented together, in this order from the object side. The second lens group consists of a second-group first lens unit that is a single lens having positive refractive power or is composed of a lens having positive refractive power and a lens having negative refractive power cemented together and a second-group second lens unit composed of a lens having positive refractive power and a lens having negative refractive power cemented together, in this order from the object side. The third lens group includes one lens having positive refractive power. Further, conditional formula (1): $0.8 < (T16+T17)/f < 2.5$ is satisfied. Therefore, it is possible to obtain a small-size super wide angle lens with a small F-number and high performance, in which the angle of incidence to an image plane is sufficiently small even at an outermost angle and the weight of a focusing group is light.

Specifically, the super wide angle lens of the present invention and the imaging apparatus using the super wide angle lens include a stop within the first lens group. Therefore, sufficient reduction of the angle of incidence to an imaging surface even at an outermost angle is easy. Further, since the first-group first lens through the first-group seventh lens are arranged, it is possible to obtain a wide angle of view, and to suppress deterioration of distortion and deterioration of astigmatism induced by the wide angle of view. Especially, the first-group first lens arranged on the most object side, and which has a meniscus shape and positive refractive power, and the first-group fifth lens having positive refractive power play important roles in correction of the aforementioned aberrations.

The first-group sixth lens unit, which is a cemented lens, effectively corrects a spherical aberration, a longitudinal chromatic aberration and curvature of field. The first-group seventh lens, which has a meniscus shape with its concave surface facing the object side, effectively corrects distortion and astigmatism because of this shape.

The first-group eighth lens unit, which is a cemented lens, effectively corrects curvature of field and astigmatism.

The second lens group consists of the second-group first lens unit that is a single lens having positive refractive power or a lens composed of a lens having positive refractive power and a lens having negative refractive power cemented together and the second-group second lens unit composed of a lens having positive refractive power and a lens having negative refractive power cemented together, in this order from the object side. Therefore, it is possible to suppress a fluctuation of a spherical aberration during focusing.

Here, if the super wide angle lens is structured in such a manner that the value is lower than the lower limit of conditional formula (1): $0.8 < (T16+T17)/f < 2.5$, the height of a marginal ray entering lenses arranged toward the object side of the first-group sixth lens unit, which is a cemented lens, becomes high, and astigmatism, a lateral chromatic aberration, distortion and the like deteriorate. On the other hand, if the super wide angle lens is structured in such a manner that the value exceeds the upper limit of conditional formula (1), astigmatism and distortion deteriorate.

DESCRIPTION OF THE PREFERRED EMBODIMENTS

Hereinafter, a super wide angle lens of the present invention and an imaging apparatus using the super wide angle lens will be described with reference to drawings.

Figure 1:
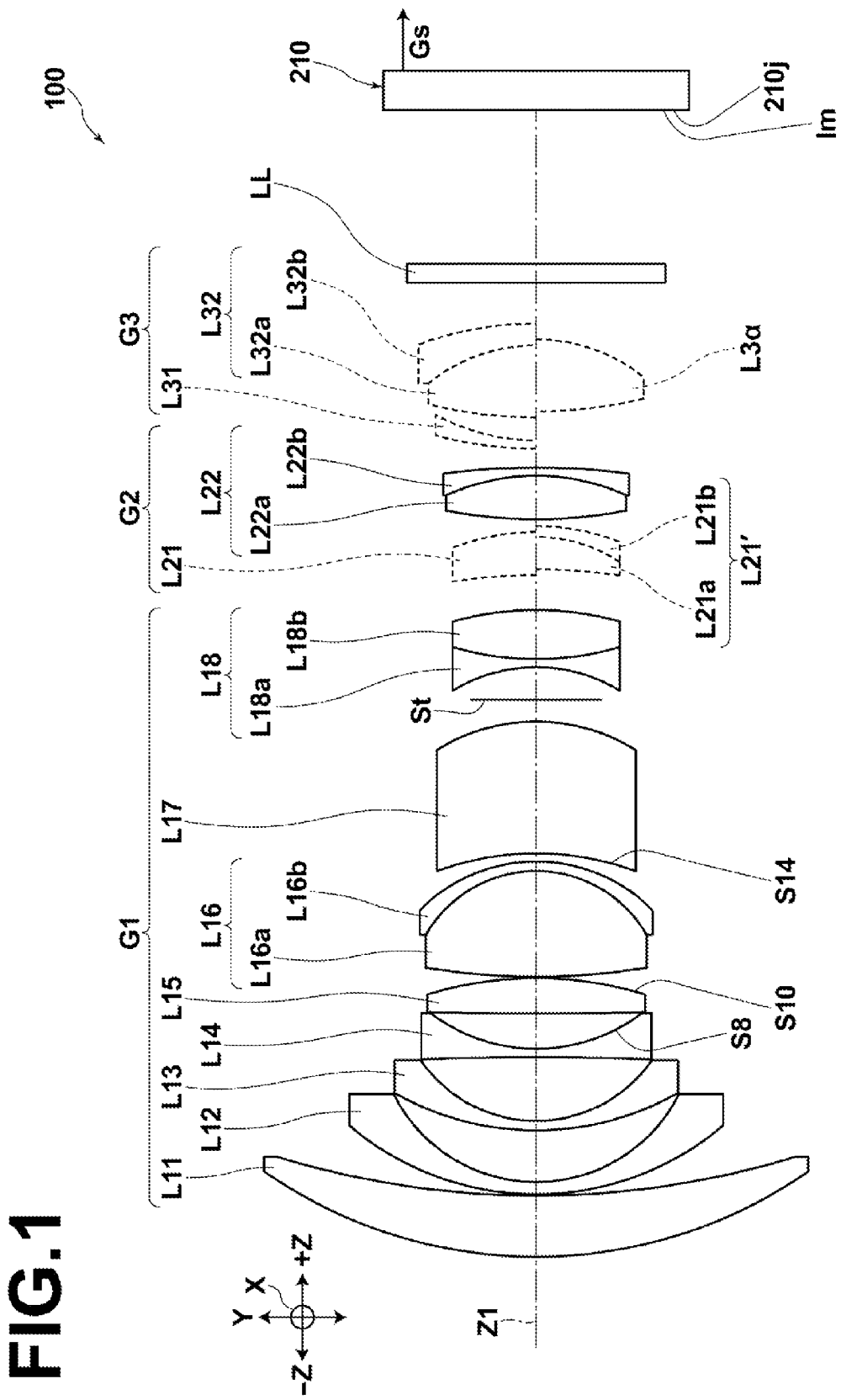
FIG. 1 is a schematic cross section illustrating the structure of a super wide angle lens according to embodiments of the present invention.

FIG. 1 is a schematic cross section illustrating the structure of a super wide angle lens according to embodiments of the present invention. In FIG. 1, arrows X, Y, Z indicate three directions orthogonal to each other in a similar manner to arrows X, Y, Z in drawings that will be described later. The direction of arrow Z indicates the same direction as optical axis Z1.

A super wide angle lens 100 illustrated in FIG. 1 substantially consists of three lens groups, and first lens group G1 having positive refractive power, second lens group G2 having positive refractive power and third lens group G3 are arranged in this order from an object side.

Further, an imaging device 210 illustrated in FIG. 1 converts optical image Im representing a subject 1, and which has been formed on a light receiving surface 210*j* of the imaging device 210 through the super wide angle lens 100, into electrical signals, and outputs image signals Gs representing this optical image Im.

Here, optical element LL without refractive power, such as a cover glass, a low-pass filter and an infrared-ray-cut filter, may be arranged between the super wide angle lens 100 and the imaging device 210.

First lens group G1 consists of first-group first lens L11 having a meniscus shape with its convex surface facing the object side and positive refractive power, first-group second lens L12 having a meniscus shape with its convex surface facing the object side and negative refractive power, first-group third lens L13 having a meniscus shape with its convex surface facing the object side and negative refractive power, first-group fourth lens L14 having negative refractive power, and lens surface S8 of which with the smaller absolute value of a curvature radius faces an image side, first-group fifth lens L15 having positive refractive power, and lens surface S10 of which with the smaller absolute value of a curvature radius faces the image side, first-group sixth lens unit L16 that is a cemented lens composed of lens L16a having positive refractive power and lens L16b having negative refractive power cemented together, first-group seventh lens L17 having a meniscus shape with its concave surface S14 facing the object side and a large center thickness, stop St and first-group eighth lens unit L18 that is a cemented lens composed of lens L18a having negative refractive power and lens L18b having positive refractive power cemented together, in this order from the object side.

The expression "a lens surface with the smaller absolute value of a curvature radius" means one of an object-side lens surface and an image-side lens surface constituting a lens, and an absolute value of a curvature radius of which is the smaller.

Here, first-group first lens L11 arranged on the most object side, and which has a meniscus shape and positive refractive power, and first-group fifth lens L15 having positive refractive power can keep lateral chromatic aberrations from a middle angle of view through a peripheral angle of view at low levels by appropriately maintaining the balance of refractive indices of materials constituting these lenses.

Second lens group G2 consists of second-group first lens L21 that is a single lens having positive refractive power or second-group first lens unit L21' that is a cemented lens composed of lens L21a having positive refractive power and lens L21b having negative refractive power cemented together, and second-group second lens unit L22 composed of lens L22a having positive refractive power and lens L22b having negative refractive power cemented together, in this order from the object side.

Third lens group G3 includes at least one lens L3α having positive refractive power.

Further, this super wide angle lens satisfies conditional formula (1): $0.8<(T16+T17)/f<2.5$. Here, T16 is a thickness of first-group sixth lens unit L16 that is a cemented lens, and T17 is a thickness of first-group seventh lens L17, and f is a focal length of an entire lens system when the system is focused on an object point at infinity.

It is desirable that this super wide angle lens 100 satisfies conditional formula (1'): $1.0<(T16+T17)/f<2.0$. It is more desirable that conditional formula (1"): $1.1<(T16+T17)/f<1.9$ is satisfied.

Further, it is desirable that the super wide angle lens 100 satisfies conditional formula (2): $0.20<f/f16<0.60$. It is more desirable that conditional formula (2'): $0.30<f/f16<0.50$ is satisfied. Here, f16 is a focal length of first-group sixth lens unit L16 that is a cemented lens.

Here, if the super wide angle lens 100 is structured in such a manner that the value is lower than the lower limit of conditional formula (2), curvature of field is over-corrected. On the other hand, if the super wide angle lens 100 is structured in such a manner that the value exceeds the upper limit of conditional formula (2), curvature of field is under-corrected.

Further, it is desirable that this super wide angle lens 100 is structured in such a manner to perform focusing by moving only second lens group G2 in the direction of the optical axis, and to satisfy conditional formula (3): $0.1<f/f2<0.4$. It is more desirable that the super wide angle lens 100 is structured in such a manner to satisfy conditional formula (3'): $0.15<f/f2<0.3$. Here, f2 is a focal length of second lens group G2.

Here, if the value is lower than the lower limit of conditional formula (3), a movement amount of a lens or lenses moved during focusing becomes too large. On the other hand, if the value exceeds the upper limit of conditional formula (3), a fluctuation of a spherical aberration during focusing becomes too large.

Further, when the super wide angle lens 100 is structured in such a manner to perform focusing by moving second lens group G2 in the direction of the optical axis, and to satisfy conditional formula (3): $0.1<f/f2<0.4$, it is desirable that conditional formula (4): $0.4<Tsum2/f<0.9$ is further satisfied. It is more desirable that conditional formula (4'): $0.5<Tsum2/f<0.8$ is satisfied. Here, Tsum2 is a total thickness of lenses constituting second lens group G2.

Here, if the value is lower than the lower limit of conditional formula (4), the thickness of a lens or lenses constituting second lens group G2 becomes too thin, and that causes a problem in processing. On the other hand, if the value exceeds the upper limit of conditional formula (4), the mass of a lens or lenses to be moved during focusing becomes too large. Therefore, the speed of focusing becomes slow.

Further, it is desirable that third lens group G3 consists of third-group first lens L31 having a meniscus shape with its concave surface facing the image side and negative refractive power and third-group second lens unit L32 that is a cemented lens composed of lens L32a having positive refractive power and lens L32b having negative refractive power cemented together, in this order from the object side. Consequently, it is possible to correct astigmatism and a coma aberration at a large angle of view. Here, lens L32a having positive refractive power corresponds to lens L3α having positive refractive power in third lens group G3.

EXAMPLES

Next, Examples 1 through 4 showing specific numerical value data of the super wide angle lens of the present invention will be collectively described with reference to FIGS. 2 through 5, FIGS. 6 through 9, Tables 1A, 1B through Tables 4A, 4B, and Table 5. In FIGS. 2 through 5, the same signs as the signs used in FIG. 1, which illustrates the super wide angle lens 100, represent composition elements corresponding to the composition elements in FIG. 1.

The structure of the lens systems illustrated in FIGS. 2 through 5, aberration diagrams illustrated in FIGS. 6 through 9 and the like illustrate a state when the system is focused on an object at infinity.

Example 1

Figure 2:
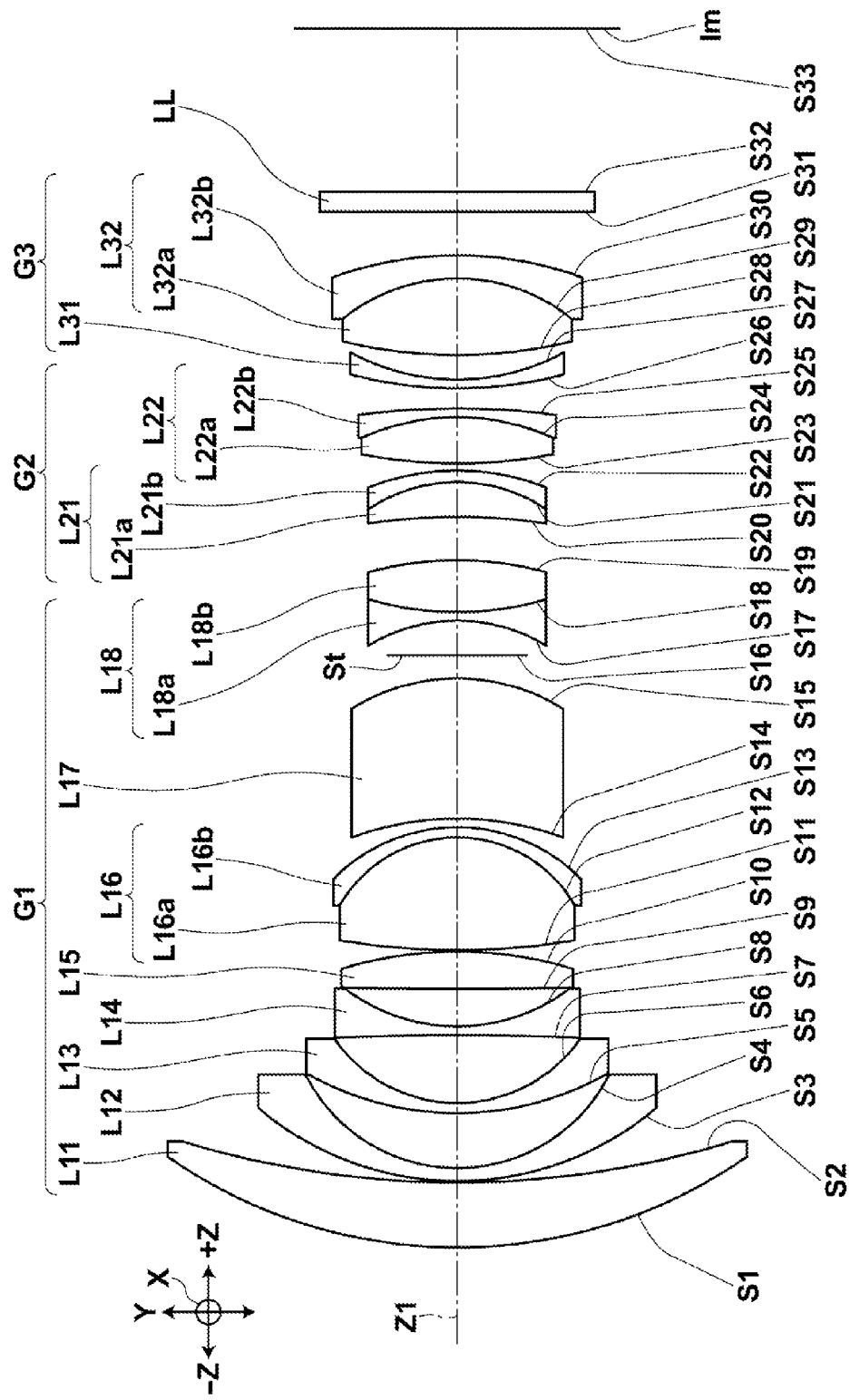
FIG. 2 is a schematic cross section illustrating the structure of a super wide angle lens in Example 1.

FIG. 2 is a schematic cross section illustrating the structure of a super wide angle lens in Example 1.

The super wide angle lens in Example 1 is structured so as to satisfy all of the aforementioned conditional formulas.

Table 1A shows lens data about the super wide angle lens in Example 1. In the lens data shown in Table 1A, surface number i shows the surface number of i-th surface Si (i=1, 2, 3 . . . ) that sequentially increases toward the image side, and the surface number of a surface arranged on the most object side is the first surface. In the lens data of Table 1A, surface numbers are assigned to surfaces including also aperture stop St, optical element LL without refractive power, and an image formation plane on which optical image Im is formed.

In Table 1A, sign Ri represents a curvature radius of an i-th surface (i=1, 2, 3 . . . ), and sign Di represents a surface distance between the i-th surface (i=1, 2, 3 . . . ) and an (i+1)th surface on optical axis Z1. The number of "i" in sign Ri and sign Di corresponds to the number of "i" in sign Si (i=1, 2, 3 . . . ) representing a lens surface, a stop or the like.

Further, sign ndj in Table 1A represents a refractive index for d-line (wavelength is 587.6 nm) of a j-th optical element (j=1, 2, 3 . . . ) that sequentially increases toward the image side, and the optical element arranged on the most object side is the first optical element. Sign vdj represents an Abbe number of the j-th optical element for d-line.

Specification in Table 1B shows values for a focal length of an entire lens system: f', F-number: FNo. and full angle of view: 2ω.

The numerical values written in Tables 1A, 1B through Tables 4A, 4B and aberration diagrams of FIGS. 6 through 9 are normalized values so that the focal length of the entire lens system focused on an object at infinity is 1.0. Further, the curvature radius is positive when a surface is convex toward the object side, and the curvature radius is negative when a surface is convex toward the image side.

TABLE 1A

EXAMPLE 1 • LENS DATA (n, ν for d-LINE)

| SURFACE NUMBER i | CURVATURE RADIUS Ri | SURFACE DISTANCE Di | ndj | vdj |
|---|---|---|---|---|
| 1 | 3.4609 | 0.45 | 1.83481 | 42.73 |
| 2 | 6.3909 | 0.01 | | |
| 3 | 2.1006 | 0.09 | 1.83400 | 37.16 |
| 4 | 1.1634 | 0.38 | | |
| 5 | 2.0842 | 0.07 | 1.83400 | 37.16 |
| 6 | 1.0240 | 0.47 | | |
| 7 | −19.5647 | 0.06 | 1.83400 | 37.16 |
| 8 | 1.2659 | 0.26 | | |
| 9 | 37.3869 | 0.26 | 1.69895 | 30.13 |
| 10 | −2.6868 | 0.01 | | |
| 11 | 4.8307 | 0.78 | 1.48749 | 70.23 |
| 12 | −0.9277 | 0.07 | 1.85026 | 32.27 |
| 13 | −1.1884 | 0.06 | | |
| 14 | −2.0818 | 0.97 | 1.48749 | 70.23 |
| 15 | −1.3653 | 0.16 | | |
| 16 (STOP) | ∞ | 0.24 | | |
| 17 | −1.1638 | 0.06 | 1.54814 | 45.79 |
| 18 | 2.1582 | 0.36 | 1.84661 | 23.78 |
| 19 | −2.2740 | 0.29 | | |

TABLE 1A-continued

EXAMPLE 1 • LENS DATA (n, ν for d-LINE)

| SURFACE NUMBER i | CURVATURE RADIUS Ri | SURFACE DISTANCE Di | ndj | vdj |
|---|---|---|---|---|
| 20 | −4.1340 | 0.24 | 1.49700 | 81.54 |
| 21 | −1.0945 | 0.08 | 1.84661 | 23.78 |
| 22 | −1.6544 | 0.05 | | |
| 23 | 3.4492 | 0.32 | 1.49700 | 81.54 |
| 24 | −1.5768 | 0.06 | 1.84661 | 23.78 |
| 25 | −5.2658 | 0.15 | | |
| 26 | 2.8519 | 0.06 | 1.84661 | 23.78 |
| 27 | 1.5215 | 0.17 | | |
| 28 | 3.3169 | 0.53 | 1.61272 | 58.72 |
| 29 | −1.2464 | 0.16 | 1.90366 | 31.32 |
| 30 | −2.4820 | 0.30 | | |
| 31 | ∞ | 0.14 | 1.51632 | 64.00 |
| 32 | ∞ | 1.13 | | |
| 33 (IMAGE PLANE) | ∞ | | | |

TABLE 1B

EXAMPLE 1 • SPECIFICATION

| | IFN |
|---|---|
| f' | 1.00 |
| FNo. | 2.70 |
| 2ω [°] | 96.0 |

Figure 6:
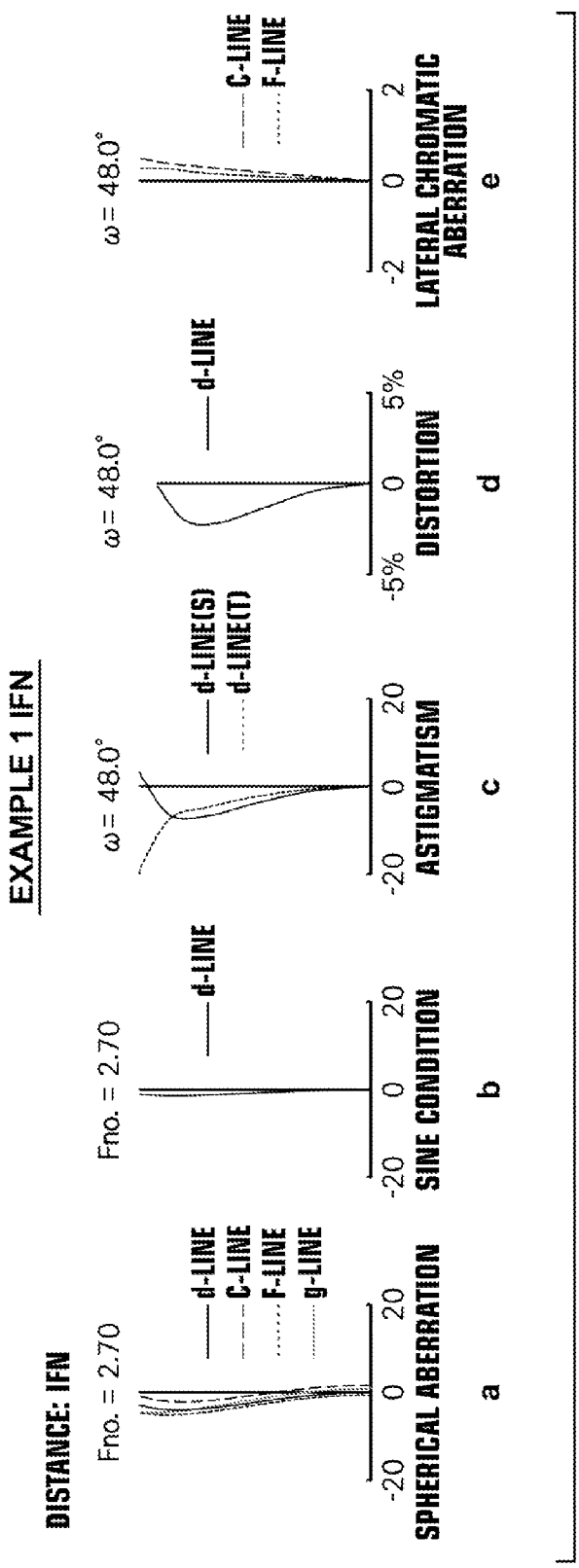
FIG. 6 illustrates aberration diagrams of the super wide angle lens in Example 1.

FIG. 6 illustrates aberration diagrams of the super wide angle lens in Example 1. A diagram indicated by sign a illustrates a spherical aberration, and a diagram indicated by sign b illustrates offense against the sine condition. A diagram indicated by sign c illustrates astigmatism, and a diagram indicated by sign d illustrates distortion, and a diagram indicated by sign e illustrates a lateral chromatic aberration.

In FIG. 6, various aberrations for light with the wavelengths of d-line, C-line, F-line and g-line are illustrated.

In the diagram of astigmatism, a solid line indicates an aberration in a sagittal direction, and a broken line indicates an aberration in a tangential direction. Further, the numerical values on the top of the diagram of a spherical aberration and the diagram of a sine condition represent an F-number, and the numerical values on the top of the other diagrams of aberrations represents a half angle of view.

Further, Table 5 shows values corresponding to each numerical expression in the aforementioned conditional formulas with respect to each of super wide angle lenses in Examples 1 through 4. The values of the numerical expressions in Table 5 are obtainable from the lens data shown in Table 1 and the like. Table 5 will be shown at the end of descriptions about the examples.

The method for reading or the like of FIG. 2 illustrating the structure of the super wide angle lens in Example 1, FIG. 6 illustrating aberrations, Table 1A showing lens data, Table 1B showing specification, and Table 5 showing values about each numerical expression in the conditional formulas are similar also for figures and tables about Examples 2 through 4, which will be described later. Therefore, explanations of them will be omitted with respect to the examples described hereinafter.

Example 2

Figure 3:
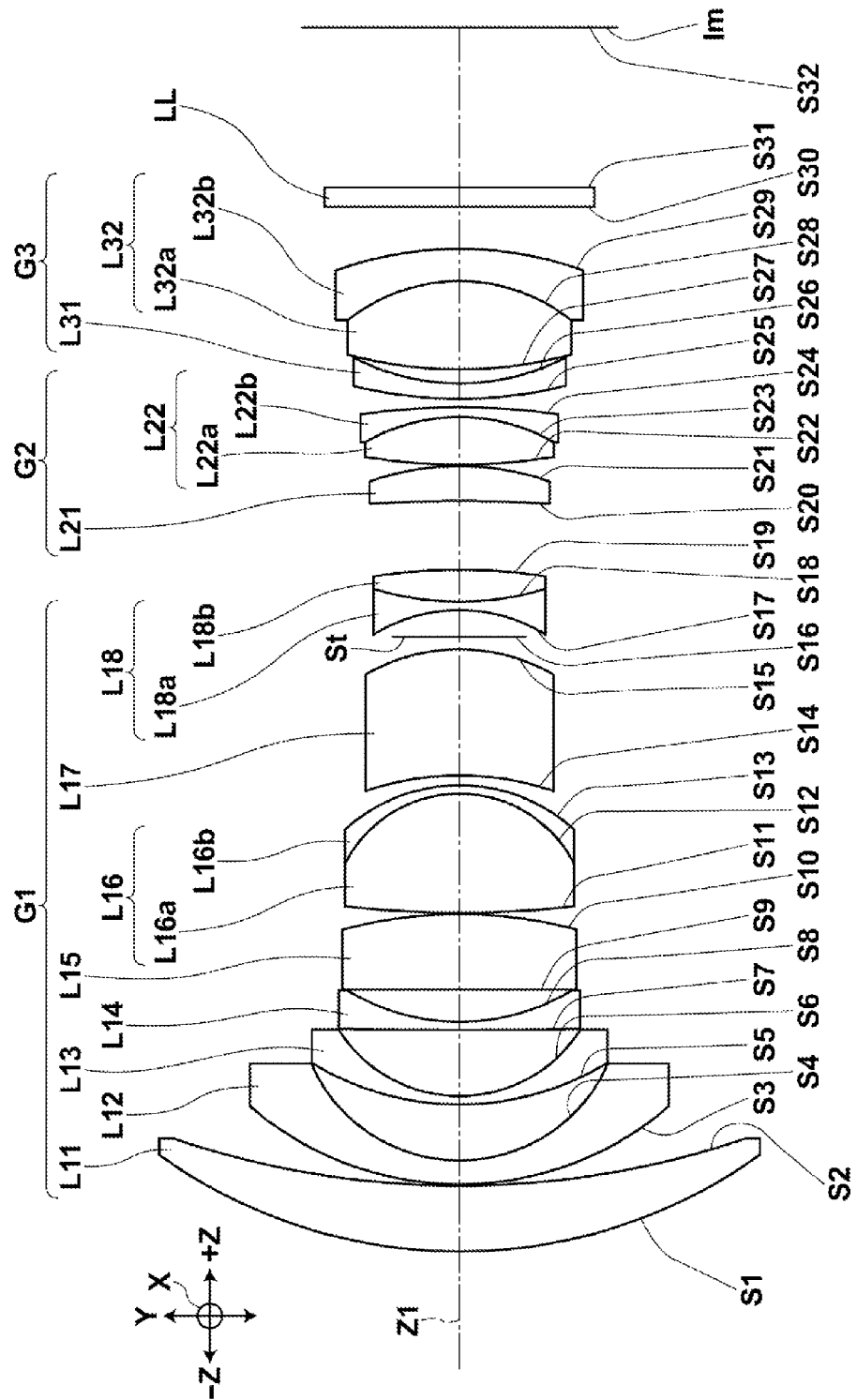
FIG. 3 is a schematic cross section illustrating the structure of a super wide angle lens in Example 2.

FIG. 3 is a schematic cross section illustrating the structure of a super wide angle lens in Example 2.

The super wide angle lens in Example 2 is structured so as to satisfy all of the aforementioned conditional formulas (1) through (4).

Figure 7:
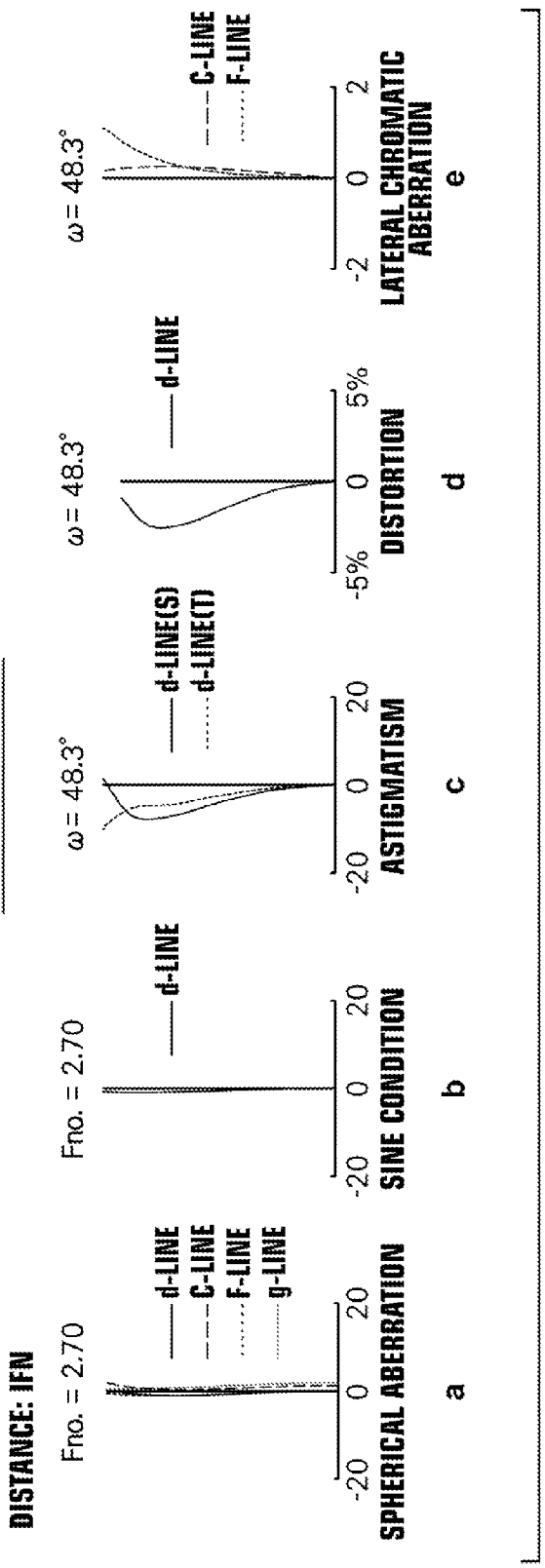
FIG. 7 illustrates aberration diagrams of the super wide angle lens in Example 2.

FIG. 7 illustrates aberration diagrams of the super wide angle lens in Example 2.

The following Table 2A shows lens data about the super wide angle lens in Example 2. Table 2B shows specification of the super wide angle lens in Example 2.

TABLE 2A

EXAMPLE 2 • LENS DATA (n, ν for d-LINE)

| SURFACE NUMBER i | CURVATURE RADIUS Ri | SURFACE DISTANCE Di | ndj | νdj |
|---|---|---|---|---|
| 1 | 3.6181 | 0.47 | 1.83481 | 42.73 |
| 2 | 6.2625 | 0.01 | | |
| 3 | 2.2509 | 0.17 | 1.83400 | 37.16 |
| 4 | 1.1452 | 0.40 | | |
| 5 | 1.9944 | 0.06 | 1.83400 | 37.16 |
| 6 | 1.0119 | 0.47 | | |
| 7 | 38.8464 | 0.06 | 1.83400 | 37.16 |
| 8 | 1.5289 | 0.23 | | |
| 9 | 3964.3568 | 0.54 | 1.80000 | 29.84 |
| 10 | −3.1807 | 0.01 | | |
| 11 | 7.1864 | 0.85 | 1.48749 | 70.23 |
| 12 | −0.9088 | 0.06 | 1.85026 | 32.27 |
| 13 | −1.1993 | 0.07 | | |
| 14 | −2.0523 | 0.90 | 1.48749 | 70.23 |
| 15 | −1.3262 | 0.09 | | |
| 16 (STOP) | ∞ | 0.19 | | |
| 17 | −1.1482 | 0.06 | 1.54072 | 47.23 |
| 18 | 2.0648 | 0.23 | 1.84661 | 23.78 |
| 19 | −3.8228 | 0.48 | | |
| 20 | −10.1207 | 0.25 | 1.49700 | 81.54 |
| 21 | −1.8924 | 0.01 | | |
| 22 | 3.9976 | 0.34 | 1.49700 | 81.54 |
| 23 | −1.3350 | 0.07 | 1.84661 | 23.78 |
| 24 | −4.8819 | 0.07 | | |
| 25 | 3.1036 | 0.11 | 1.84661 | 23.78 |
| 26 | 1.6250 | 0.10 | | |
| 27 | 3.0287 | 0.63 | 1.62041 | 60.29 |
| 28 | −1.2664 | 0.23 | 1.90366 | 31.32 |
| 29 | −2.5836 | 0.30 | | |
| 30 | ∞ | 0.14 | 1.51632 | 64.00 |
| 31 | ∞ | 1.14 | | |
| 32 (IMAGE PLANE) | ∞ | | | |

TABLE 2B

EXAMPLE 2 • SPECIFICATION

| | IFN |
|---|---|
| f′ | 1.00 |
| FNo. | 2.70 |
| 2ω [°] | 96.6 |

Example 3

Figure 4:
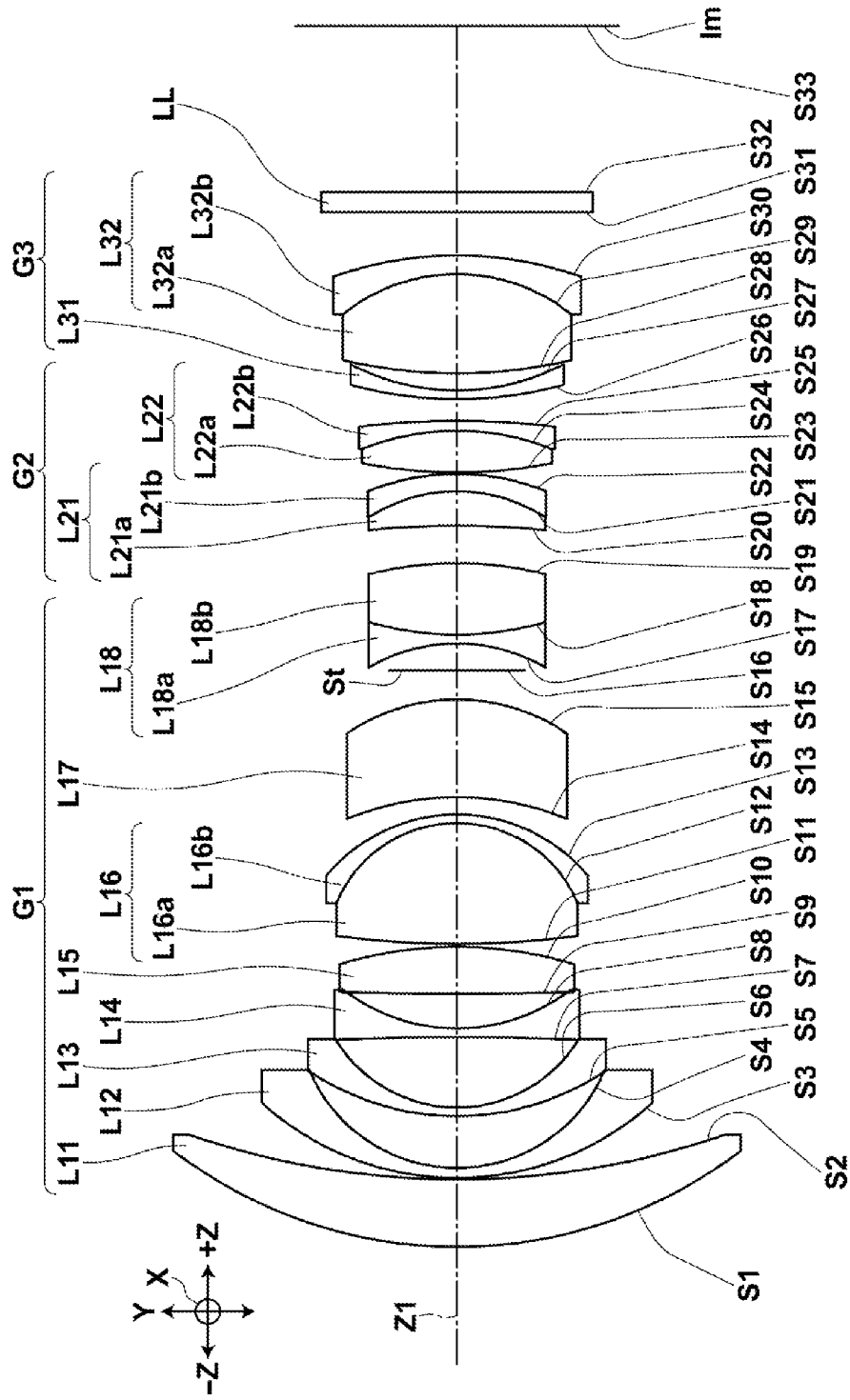
FIG. 4 is a schematic cross section illustrating the structure of a super wide angle lens in Example 3.

FIG. 4 is a schematic cross section illustrating the structure of a super wide angle lens in Example 3.

The super wide angle lens in Example 3 is structured so as to satisfy all of the aforementioned conditional formulas (1) through (4).

Figure 8:
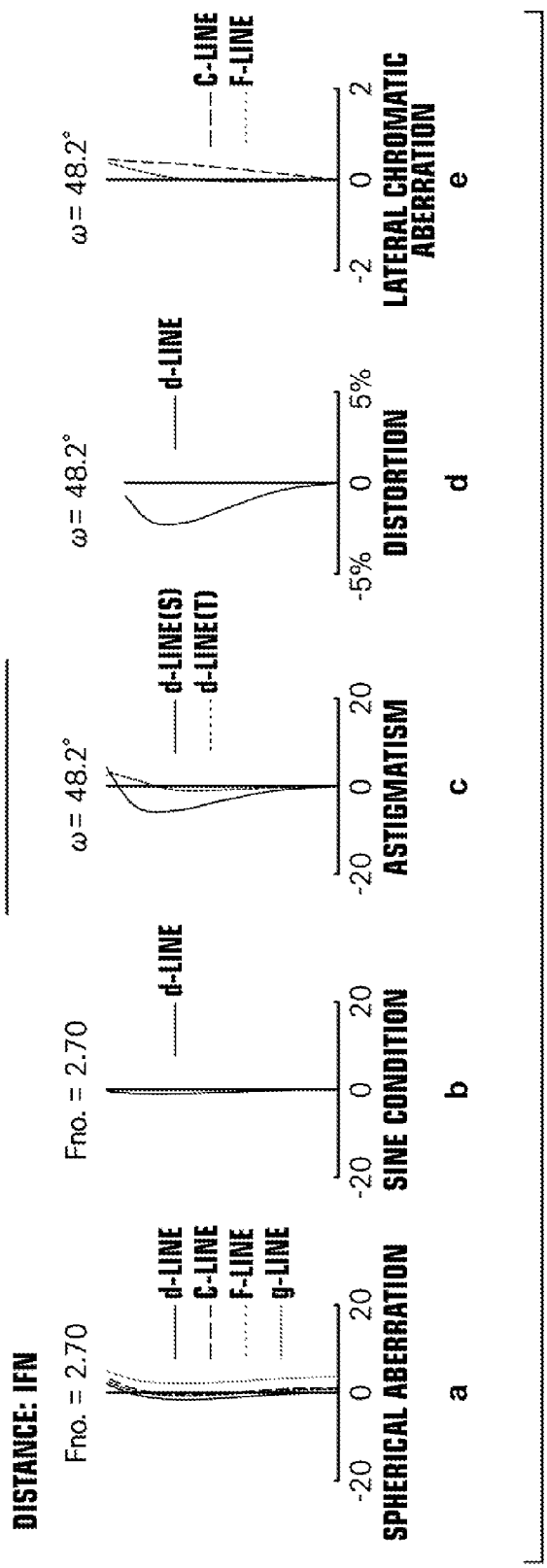
FIG. 8 illustrates aberration diagrams of the super wide angle lens in Example 3.

FIG. 8 illustrates aberration diagrams of the super wide angle lens in Example 3.

The following Table 3A shows lens data about the super wide angle lens in Example 3. Table 3B shows specification of the super wide angle lens in Example 3.

TABLE 3A

EXAMPLE 3 • LENS DATA (n, ν for d-LINE)

| SURFACE NUMBER i | CURVATURE RADIUS Ri | SURFACE DISTANCE Di | ndj | νdj |
|---|---|---|---|---|
| 1 | 3.1991 | 0.47 | 1.83481 | 42.73 |
| 2 | 5.6490 | 0.01 | | |
| 3 | 1.9974 | 0.07 | 1.83400 | 37.16 |
| 4 | 1.1060 | 0.36 | | |
| 5 | 1.8256 | 0.06 | 1.83400 | 37.16 |
| 6 | 0.9805 | 0.49 | | |
| 7 | −18.2893 | 0.06 | 1.83400 | 37.16 |
| 8 | 1.2781 | 0.24 | | |
| 9 | 23.3843 | 0.33 | 1.69895 | 30.13 |
| 10 | −2.7244 | 0.02 | | |
| 11 | 6.3293 | 0.84 | 1.48749 | 70.23 |
| 12 | −0.9022 | 0.06 | 1.85026 | 32.27 |
| 13 | −1.1664 | 0.12 | | |
| 14 | −1.9751 | 0.68 | 1.48749 | 70.23 |
| 15 | −1.3383 | 0.20 | | |
| 16 (STOP) | ∞ | 0.19 | | |
| 17 | −1.1898 | 0.06 | 1.54814 | 45.79 |
| 18 | 2.1447 | 0.50 | 1.84661 | 23.78 |
| 19 | −2.3957 | 0.25 | | |
| 20 | −6.1556 | 0.24 | 1.43875 | 94.93 |
| 21 | −1.1103 | 0.12 | 1.80518 | 25.42 |
| 22 | −1.6359 | 0.01 | | |
| 23 | 3.3058 | 0.29 | 1.43875 | 94.93 |
| 24 | −1.7665 | 0.07 | 1.84661 | 23.78 |
| 25 | −5.4643 | 0.16 | | |
| 26 | 2.7418 | 0.06 | 1.84661 | 23.78 |
| 27 | 1.5583 | 0.12 | | |
| 28 | 3.4126 | 0.69 | 1.61800 | 63.33 |
| 29 | −1.2509 | 0.13 | 1.90366 | 31.32 |
| 30 | −2.5587 | 0.30 | | |
| 31 | ∞ | 0.14 | 1.51632 | 64.00 |
| 32 | ∞ | 1.16 | | |
| 33 (IMAGE PLANE) | ∞ | | | |

TABLE 3B

EXAMPLE 3 • SPECIFICATION

| | IFN |
|---|---|
| f′ | 1.00 |
| FNo. | 2.70 |
| 2ω [°] | 96.4 |

Example 4

Figure 5:
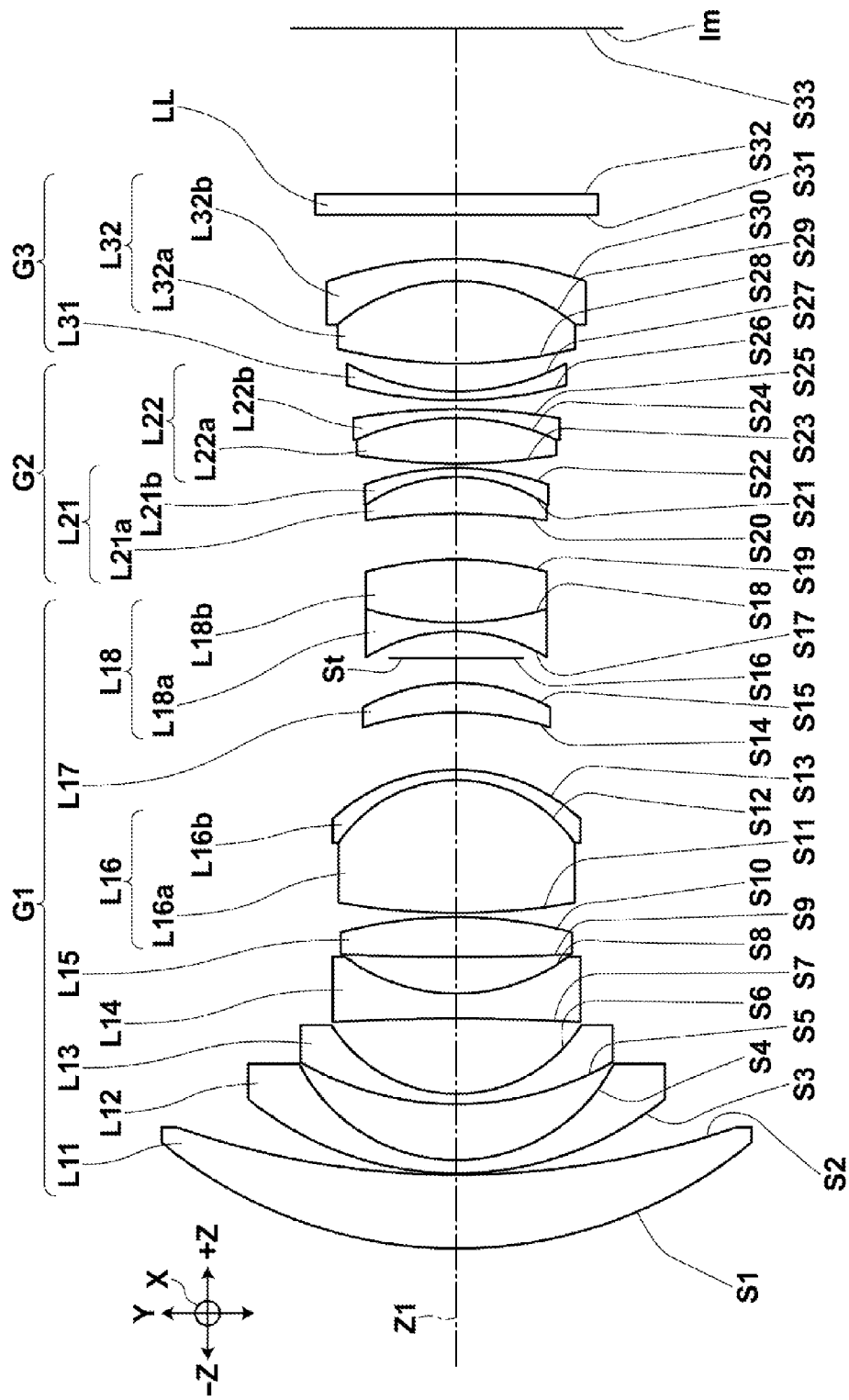
FIG. 5 is a schematic cross section illustrating the structure of a super wide angle lens in Example 4.

FIG. 5 is a schematic cross section illustrating the structure of a super wide angle lens in Example 4.

The super wide angle lens in Example 4 is structured so as to satisfy all of the aforementioned conditional formulas (1) through (4).

Figure 9:
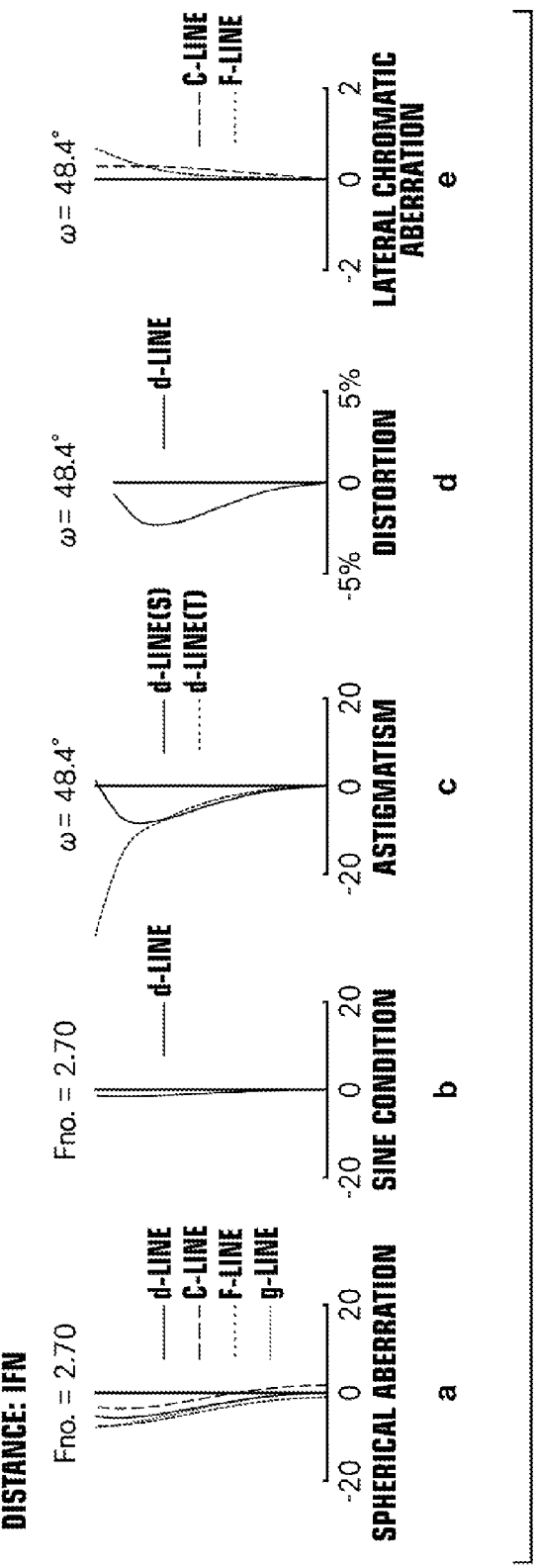
FIG. 9 illustrates aberration diagrams of the super wide angle lens in Example 4.

FIG. 9 illustrates aberration diagrams of the super wide angle lens in Example 4.

The following Table 4A shows lens data about the super wide angle lens in Example 4. Table 4B shows specification of the super wide angle lens in Example 4.

TABLE 4A

EXAMPLE 4 • LENS DATA (n, ν for d-LINE)

| SURFACE NUMBER i | CURVATURE RADIUS Ri | SURFACE DISTANCE Di | ndj | νdj |
|---|---|---|---|---|
| 1 | 3.1026 | 0.50 | 1.83481 | 42.73 |
| 2 | 5.6684 | 0.01 | | |
| 3 | 2.2042 | 0.09 | 1.83400 | 37.16 |

TABLE 4A-continued

EXAMPLE 4 • LENS DATA (n, v for d-LINE)

| SURFACE NUMBER i | CURVATURE RADIUS Ri | SURFACE DISTANCE Di | ndj | vdj |
|---|---|---|---|---|
| 4 | 1.1868 | 0.38 | | |
| 5 | 2.0789 | 0.07 | 1.83400 | 37.16 |
| 6 | 0.9962 | 0.51 | | |
| 7 | −14.9158 | 0.17 | 1.83400 | 37.16 |
| 8 | 1.2534 | 0.25 | | |
| 9 | 16.0813 | 0.27 | 1.69895 | 30.13 |
| 10 | −3.0173 | 0.03 | | |
| 11 | 4.6146 | 0.90 | 1.48749 | 70.23 |
| 12 | −0.9550 | 0.07 | 1.85026 | 32.27 |
| 13 | −1.2115 | 0.39 | | |
| 14 | −2.0124 | 0.20 | 1.48749 | 70.23 |
| 15 | −1.2795 | 0.17 | | |
| 16 (STOP) | ∞ | 0.18 | | |
| 17 | −1.1402 | 0.06 | 1.54814 | 45.79 |
| 18 | 2.0480 | 0.43 | 1.84661 | 23.78 |
| 19 | −2.2137 | 0.30 | | |
| 20 | −4.3271 | 0.25 | 1.49700 | 81.54 |
| 21 | −1.0765 | 0.06 | 1.84661 | 23.78 |
| 22 | −1.7633 | 0.03 | | |
| 23 | 3.9009 | 0.31 | 1.49700 | 81.54 |
| 24 | −1.6068 | 0.06 | 1.84661 | 23.78 |
| 25 | −3.9561 | 0.07 | | |
| 26 | 2.7328 | 0.06 | 1.84661 | 23.78 |
| 27 | 1.5320 | 0.19 | | |
| 28 | 3.2436 | 0.56 | 1.61272 | 58.72 |
| 29 | −1.2310 | 0.15 | 1.90366 | 31.32 |
| 30 | −2.5333 | 0.30 | | |
| 31 | ∞ | 0.14 | 1.51632 | 64.00 |
| 32 | ∞ | 1.13 | | |
| 33 (IMAGE PLANE) | ∞ | | | |

TABLE 4B

EXAMPLE 4 • SPECIFICATION

| | IFN |
|---|---|
| f | 0.99 |
| FNo. | 2.70 |
| 2ω [°] | 96.8 |

The following Table 5 shows values about each conditional formula, as described above.

TABLE 5

| FORMULA NUMBER | NUMERICAL EXPRESSION IN CONDITIONAL FORMULA | EXAMPLE 1 | EXAMPLE 2 | EXAMPLE 3 | EXAMPLE 4 |
|---|---|---|---|---|---|
| (1) | (T16 + T17)/f | 1.81590 | 1.81215 | 1.57608 | 1.17738 |
| (2) | f/f16 | 0.41640 | 0.37244 | 0.39793 | 0.41107 |
| (3) | f/f2 | 0.17504 | 0.25765 | 0.16905 | 0.17750 |
| (4) | Tsum2/f | 0.69842 | 0.66078 | 0.71821 | 0.68429 |

Figure 10:
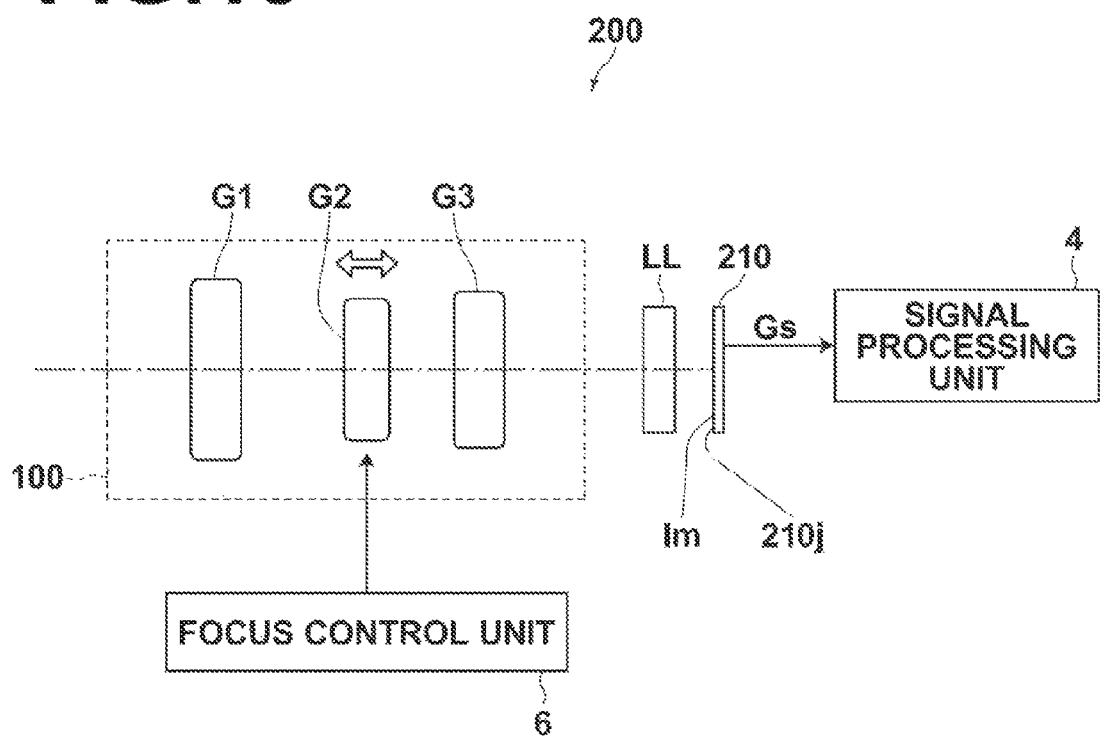
FIG. 10 is a diagram illustrating an imaging apparatus using a super wide angle lens of the present invention.

FIG. 10 is a schematic diagram illustrating the configuration of an imaging apparatus using a super wide angle lens according to an embodiment of the present invention, as an example of an imaging apparatus according to an embodiment of the present invention. Examples of such an imaging apparatus are a digital camera, a camera for broadcasting, a camera for shooting a movie, and the like using a small-size super wide angle lens with high performance.

An imaging apparatus 200 illustrated in FIG. 10 includes the super wide angle lens 100, filter LL arranged toward the image side of the super wide angle lens 100, an imaging device 210 that images optical image Im of a subject formed by the super wide angle lens 100, and a signal processing unit 4 that performs operation processing on image signals Gs representing optical image Im, which are signals output from the imaging device 210. The super wide angle lens 100 includes a lens group that is moved during focusing. In FIG. 10, second lens group G2 is a lens group to be moved during focusing, and each lens group is conceptually illustrated. A light receiving surface 210j of the imaging device 210 is arranged in such a manner to be matched with image plane Im of the super wide angle lens 100. As the imaging device 210, for example, a CCD element, a CMOS element or the like may be used.

Further, the imaging apparatus 200 includes a focus control unit 6 for adjusting the focus of the super wide angle lens 100. Further, a stop control unit for changing the aperture diameter of aperture stop St, which is not illustrated in FIG. 10, may be provided besides the mentioned elements.

So far, the present invention has been described by using embodiments and examples. However, the present invention is not limited to the embodiments nor to the examples, and various modifications are possible. For example, values of a curvature radius, a surface distance, a refractive index, an Abbe number and the like of each lens are not limited to the values in the numerical value examples, but may be other values.

What is claimed is:

1. A super wide angle lens substantially consisting of three groups of:
   a first lens group having positive refractive power;
   a second lens group having positive refractive power; and
   a third lens group in this order from an object side,
   wherein the first lens group consists of:
   a first-group first lens having a meniscus shape with its convex surface facing the object side and positive refractive power;
   a first-group second lens having a meniscus shape with its convex surface facing the object side and negative refractive power;
   a first-group third lens having a meniscus shape with its convex surface facing the object side and negative refractive power;
   a first-group fourth lens having negative refractive power, and a lens surface of which with a smaller absolute value of a curvature radius faces an image side;
   a first-group fifth lens having positive refractive power, and a lens surface of which with a smaller absolute value of a curvature radius faces the image side;
   a first-group sixth lens unit that is a cemented lens composed of a lens having positive refractive power and a lens having negative refractive power cemented together;
   a first-group seventh lens having a meniscus shape with its concave surface facing the object side;
   a stop; and
   a first-group eighth lens unit that is a cemented lens composed of a lens having negative refractive power and a lens having positive refractive power cemented together, in this order from the object side, and
   wherein the second lens group consists of:
   a second-group first lens unit that is a single lens having positive refractive power or a cemented lens composed of a lens having positive refractive power and a lens having negative refractive power cemented together; and
   a second-group second lens unit that is a cemented lens composed of a lens having positive refractive power and a lens having negative refractive power cemented together, in this order from the object side, and wherein the third lens group includes at least one lens having positive refractive power, and wherein the following conditional formula (1) is satisfied:

$$0.8<(T16+T17)/f<2.5 \qquad (1),$$ where

T16: a thickness of the first-group sixth lens unit that is a cemented lens,

T17: a thickness of the first-group seventh lens, and f: a focal length of an entire lens system when the system is focused on an object point at infinity.

2. The super wide angle lens, as defined in claim 1, wherein the following conditional formula (1') is satisfied:

$$1.0<(T16+T17)/f<2.0 \qquad (1').$$

3. The super wide angle lens, as defined in claim 2, wherein the following conditional formula is satisfied:

$$0.20<f/f16<0.60 \qquad (2),$$ where f16: a focal length of the first-group sixth lens unit that is a cemented lens.

4. The super wide angle lens, as defined in claim 3, wherein the following conditional formula is satisfied:

$$0.30<f/f16<0.50 \qquad (2').$$

5. The super wide angle lens, as defined in claim 2, wherein focusing is performed by moving the second lens group in the direction of an optical axis, and wherein the following conditional formula is satisfied:

$$0.1<f/f2<0.4 \qquad (3),$$ where f2: a focal length of the second lens group.

6. The super wide angle lens, as defined in claim 5, wherein the following conditional formula is satisfied:

$$0.15<f/f2<0.3 \qquad (3').$$

7. The super wide angle lens, as defined in claim 5, wherein the following conditional formula is satisfied:

$$0.4<Tsum2/f<0.9 \qquad (4),$$ where

Tsum2: a total thickness of lenses constituting the second lens group.

8. The super wide angle lens, as defined in claim 7, wherein the following conditional formula is satisfied:

$$0.5<Tsum2/f<0.8 \qquad (4').$$

9. The super wide angle lens, as defined in claim 2, wherein the third lens group consists of:

a third-group first lens having a meniscus shape with its concave surface facing the image side and negative refractive power; and a third-group second lens unit that is a cemented lens composed of a lens having positive refractive power and a lens having negative refractive power cemented together, in this order from the object side.

10. An imaging apparatus comprising:

the super wide angle lens, as defined in claim 2.

11. The super wide angle lens, as defined in claim 1, wherein the following conditional formula (1") is satisfied:

$$1.1<(T16+T17)/f<1.9 \qquad (1'').$$

12. The super wide angle lens, as defined in claim 11, wherein the following conditional formula is satisfied:

$$0.20<f/f16<0.60 \qquad (2),$$ where f16: a focal length of the first-group sixth lens unit that is a cemented lens.

13. The super wide angle lens, as defined in claim 1, wherein the following conditional formula is satisfied:

$$0.20<f/f16<0.60 \qquad (2),$$ where f16: a focal length of the first-group sixth lens unit that is a cemented lens.

14. The super wide angle lens, as defined in claim 13, wherein the following conditional formula is satisfied:

$$0.30<f/f16<0.50 \qquad (2').$$

15. The super wide angle lens, as defined in claim 1, wherein focusing is performed by moving the second lens group in the direction of an optical axis, and wherein the following conditional formula is satisfied:

$$0.1<f/f2<0.4 \qquad (3),$$ where f2: a focal length of the second lens group.

16. The super wide angle lens, as defined in claim 15, wherein the following conditional formula is satisfied:

$$0.15<f/f2<0.3 \qquad (3').$$

17. The super wide angle lens, as defined in claim 15, wherein the following conditional formula is satisfied:

$$0.4<Tsum2/f<0.9 \qquad (4),$$ where

Tsum2: a total thickness of lenses constituting the second lens group.

18. The super wide angle lens, as defined in claim 17, wherein the following conditional formula is satisfied:

$$0.5<Tsum2/f<0.8 \qquad (4').$$

19. The super wide angle lens, as defined in claim 1, wherein the third lens group consists of:

a third-group first lens having a meniscus shape with its concave surface facing the image side and negative refractive power; and a third-group second lens unit that is a cemented lens composed of a lens having positive refractive power and a lens having negative refractive power cemented together, in this order from the object side.

20. An imaging apparatus comprising:

the super wide angle lens, as defined in claim 1.

* * * * *